United States Patent
Kitano et al.

(10) Patent No.: US 10,638,323 B2
(45) Date of Patent: Apr. 28, 2020

(54) WIRELESS COMMUNICATION DEVICE, WIRELESS COMMUNICATION METHOD, AND COMPUTER READABLE STORAGE MEDIUM

(71) Applicant: FUJITSU LIMITED, Kawasaki-shi, Kanagawa (JP)

(72) Inventors: Tomoya Kitano, Kawasaki (JP); Hiroyuki Tanaka, Kawasaki (JP); Toshihito Nozawa, Fuchu (JP); Manabu Fujimori, Kawasaki (JP); Yasuhiro Sasagawa, Yokohama (JP); Tetsuo Ishihara, Kawasaki (JP); Hidenori Kanazawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/456,127

(22) Filed: Mar. 10, 2017

(65) Prior Publication Data
US 2017/0265081 A1  Sep. 14, 2017

(30) Foreign Application Priority Data

Mar. 14, 2016  (JP) .................................. 2016-049774

(51) Int. Cl.
*H04W 12/12* (2009.01)
*H04W 48/20* (2009.01)
(Continued)

(52) U.S. Cl.
CPC .......... *H04W 12/12* (2013.01); *H04L 63/083* (2013.01); *H04L 63/0876* (2013.01);
(Continued)

(58) Field of Classification Search
CPC ..... H04W 12/12; H04W 12/06; H04W 48/20; H04W 84/12; H04W 12/04; H04W 76/11;
(Continued)

(56) References Cited

U.S. PATENT DOCUMENTS

2007/0180244 A1  8/2007  Halasz et al.
2007/0186276 A1  8/2007  McRae et al.
(Continued)

FOREIGN PATENT DOCUMENTS

JP  2008 072402  3/2008
JP  2015 226267  12/2015
(Continued)

OTHER PUBLICATIONS

Japanese Office Action dated Aug. 6, 2019, issued in corresponding Japanese Patent Application No. 2016-049774.
(Continued)

*Primary Examiner* — Margaret G Mastrodonato
(74) *Attorney, Agent, or Firm* — Xsensus LLP (57) ABSTRACT

A wireless communication device including: a processor configured to: serve a wireless network with one or more other wireless communication devices, the wireless communication device and the one or more other wireless communication devices wirelessly publishing a specified identifier of the wireless network in common and wirelessly communicating with a wireless terminal when receiving a request, for coupling to the wireless network, transmitted based on the specified identifier from the wireless terminal, transmit to the other wireless communication device, when the wireless communication device detects that a scanned wireless signal from another wireless communication device publishes the specified identifier, a specified request for coupling to the wireless network, and determine whether the other wireless communication device is one of the one or more other wireless communication device or not based on a response, originating with the specified request, from the other wireless communication device.

15 Claims, 8 Drawing Sheets

(51) Int. Cl.
*H04W 12/06* (2009.01)
*H04L 29/06* (2006.01)
*H04W 76/11* (2018.01)
*H04W 12/04* (2009.01)
*H04W 8/00* (2009.01)
*H04L 29/12* (2006.01)
*H04W 84/12* (2009.01)
*H04W 12/00* (2009.01)

(52) U.S. Cl.
CPC ........... *H04W 12/04* (2013.01); *H04W 12/06* (2013.01); *H04W 48/20* (2013.01); *H04W 76/11* (2018.02); *H04L 61/103* (2013.01); *H04L 61/2007* (2013.01); *H04L 61/2038* (2013.01); *H04L 61/6022* (2013.01); *H04W 8/005* (2013.01); *H04W 12/00512* (2019.01); *H04W 84/12* (2013.01)

(58) Field of Classification Search
CPC .... H04W 8/005; H04W 8/26; H04L 63/0876; H04L 61/103; H04L 61/2007; H04L 61/2038; H04L 61/6022
See application file for complete search history.

(56) References Cited

U.S. PATENT DOCUMENTS

| | | | |
|---|---|---|---|
| 2011/0066756 A1 | 3/2011 | Kakumaru | |
| 2014/0325615 A1* | 10/2014 | Scahill | H04L 63/1425 726/4 |
| 2014/0337633 A1* | 11/2014 | Yang | H04W 12/08 713/178 |
| 2015/0188940 A1* | 7/2015 | Lapidous | H04W 12/12 726/15 |
| 2016/0135053 A1* | 5/2016 | Lee | H04L 63/0407 726/7 |

FOREIGN PATENT DOCUMENTS

| | | | | |
|---|---|---|---|---|
| WO | 2009/139465 A1 | 11/2009 | | |
| WO | WO 2015084152 A1 * | 6/2015 | ......... | H04L 63/0876 |

OTHER PUBLICATIONS

Sudo Koichi, Nakako No. 4, ASAHI, Asahi Co., Ltd., "Traps on Networks Aimed at You. No. 4", ASAHI PASOKON No. 370, Japan, Asahi Shimbun Company, Nov. 15, 2004, pp. 94-95.

* cited by examiner

| ID | PHRASE | TRANSMISSION FREQUENCY |
|---|---|---|
| 1 | shaping | A |
| 2 | tomorrow | B |
| 3 | with | C |
| ... | ... | ... |
| 100 | you | E |

WIRELESS COMMUNICATION DEVICE, WIRELESS COMMUNICATION METHOD, AND COMPUTER READABLE STORAGE MEDIUM

CROSS-REFERENCE TO RELATED APPLICATION

This application is based upon and claims the benefit of priority of the prior Japanese Patent Application No. 2016-049774, filed on Mar. 14, 2016, the entire contents of which are incorporated herein by reference.

FIELD

The embodiment discussed herein is related to a wireless communication device, a wireless communication method, and a computer readable storage medium.

BACKGROUND

Wireless communication environments available to unspecified users have increasingly been provided by installing access points in places such as shopping malls where many people may gather in a crowd, and by sharing service set identifiers (SSIDs) and passwords of the networks to the public. However, the wireless communication networks where SSIDs and passwords are shared by the public have a risk that an unauthorized access point (hereinafter referred to as "AP") impersonating an authorized AP may be installed by a malicious third party for the purpose of, for example, stealing a user's information and leading the user to malicious websites.

As technologies related to the above, the following first technology is proposed. That is, in the first technology, when the same pieces of identification information are included in beacons from a plurality of APs, a wireless communication device suppresses its connection so that the wireless communication device is not at least automatically connected to an AP in which the signal strength is equal to or lower than a threshold and an AP in which encryption is disabled. Further, the wireless communication device stores a connection history for valid APs, and determines that an AP is valid when identification information of the AP is found in the connection history.

Further, the following second technology is proposed. That is, in the second technology, a communication device generates a random number, transmits the generated random number to an AP, receives a random number transmitted after predetermined processing is performed in the AP, and determines whether the AP is valid based on the random number received from the AP.

Japanese Laid-open Patent Publication No. 2008-72402 and Japanese Laid-open Patent Publication No. 2015-226267 are examples of related art.

SUMMARY

According to an aspect of the invention, a wireless communication device includes a memory, and a processor coupled to the memory and the processor configured to: serve a wireless network with one or more other wireless communication devices, the wireless communication device and the one or more other wireless communication devices wirelessly publishing a specified identifier of the wireless network in common, the wireless communication device and the one or more other wireless communication device wirelessly communicating with a wireless terminal when receiving a request, for coupling to the wireless network, transmitted based on the specified identifier from the wireless terminal, scan a wireless signal transmitted from another wireless communication device, transmit to the other wireless communication device, when the wireless communication device detects that the scanned wireless signal from the other wireless communication device publishes the specified identifier, a specified request for coupling to the wireless network, and determine whether the other wireless communication device is one of the one or more other wireless communication device or not based on a response, originating with the specified request, from the other wireless communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For a provider of a wireless communication environment, the safety and reliability of the wireless communication environment to be provided are impaired when an unauthorized AP is installed. Therefore, it is desirable to detect and remove the unauthorized AP promptly when the unauthorized AP is installed without involving significant modification to the wireless communication network. However, both of the above-mentioned first and second technologies are insufficient because the first and second technologies are supposed to be applied to terminal devices that perform wireless communication with APs.

In one aspect, this embodiment has an object to facilitate detection of the presence of an unauthorized access point by a provider of a wireless communication environment.

Figure 1:
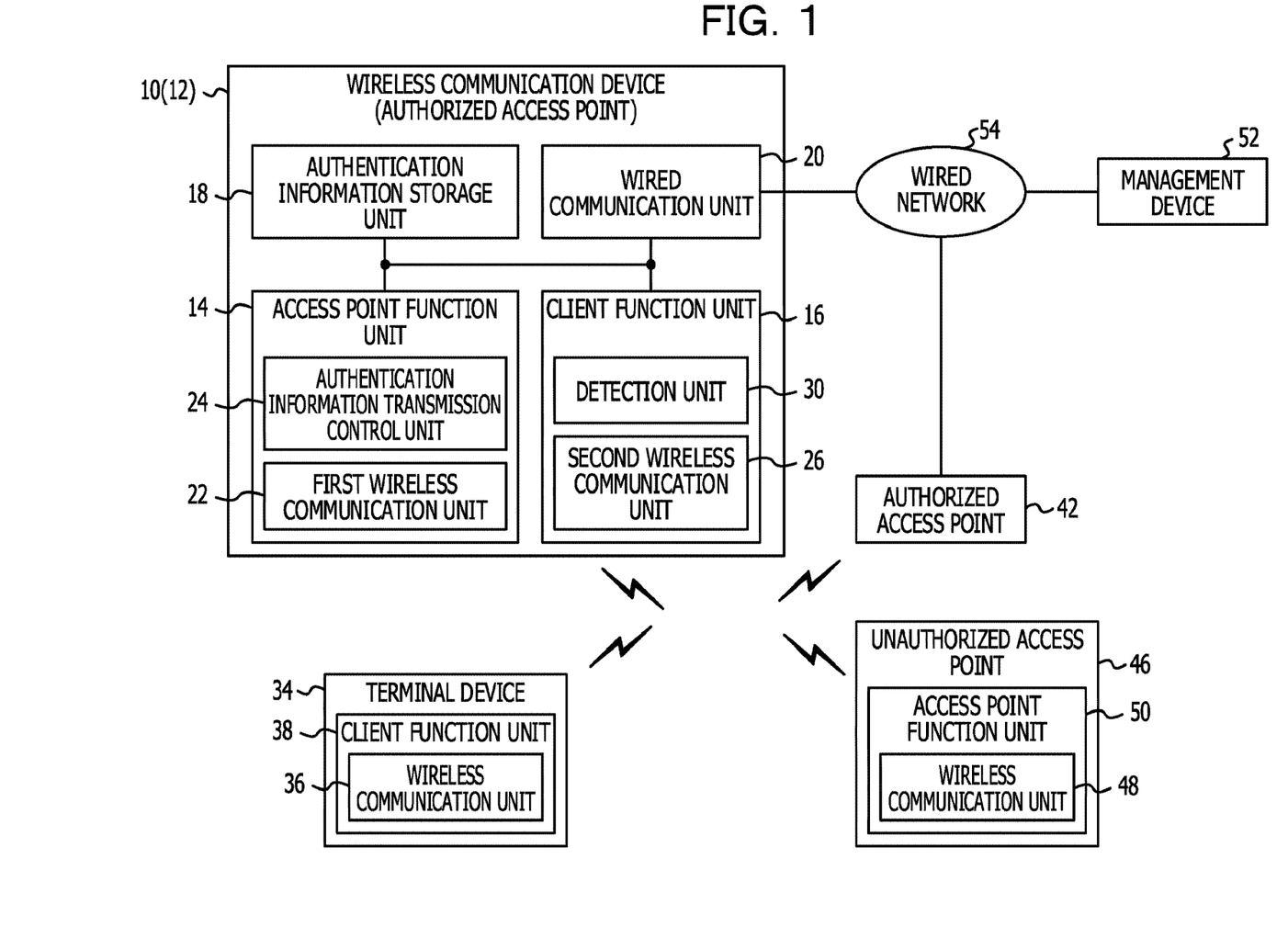
FIG. 1 is a functional block diagram illustrating a wireless communication device that operates as an authorized access point, and devices that communicate with the wireless communication device.

An example of a technology according to this embodiment is described below in detail with reference to the drawings. FIG. 1 illustrates a wireless communication device 10 that operates as a first authorized access point 12

(the "access point" is hereinafter referred to as "AP"), and a terminal device 34, a second authorized AP 42, an unauthorized AP 46, and a management device 52 that communicate with the wireless communication device 10. The wireless communication device 10 (first authorized AP 12), the second authorized AP 42, and the management device 52 are connected to each other via a wired network 54. The wireless communication device that operates as the second authorized AP 42 has the same configuration as that of the wireless communication device 10.

The first authorized AP 12 and the second authorized AP 42 are installed with a distance secured so that the ranges in which the first authorized AP 12 and the second authorized AP 42 may perform wireless communication therebetween partially overlap each other, thereby forming a single wireless communication network with the same SSID and password. FIG. 1 illustrates only two APs, that is, the first authorized AP 12 and the second authorized AP 42, as the authorized APs forming a single wireless communication network, but the number of authorized APs is not limited thereto.

The SSID and the password of the wireless communication network formed by the first authorized AP 12 and the second authorized AP 42 are shared by the public, and the wireless communication network is available to unspecified users who are present in a wirelessly communicable range of the first authorized AP 12 or the second authorized AP 42 and are carrying the terminal device 34.

The terminal device 34 with which the wireless communication network may be used includes a client function unit 38 including a wireless communication unit 36. The client function unit 38 provides a function of causing the terminal device 34 to operate as a wireless client (referred to also as slave unit) in wireless communication with an AP via the wireless communication unit 36. Any device may be employed as the terminal device 34 as long as the device may be carried by the user, and examples of the device include a smartphone, a tablet terminal, and a personal computer (PC).

Description is given taking the unauthorized AP 46 illustrated in FIG. 1 as an example. General APs include an AP function unit 50 including a wireless communication unit 48. The AP function unit 50 provides a function of causing a wireless communication device to operate as an AP (referred to also as master unit) in wireless communication with a wireless client via the wireless communication unit 48. In this embodiment, however, the SSID and the password of the wireless communication network formed by the first authorized AP 12 and the second authorized AP 42 are shared by the public, thereby raising a risk of installing the unauthorized AP 46.

In view of the above, the wireless communication device 10 includes an AP function unit 14, a client function unit 16, an authentication information storage unit 18, and a wired communication unit 20, which are connected to each other. The wired communication unit 20 is connected to the wired network 54.

The AP function unit 14 includes a first wireless communication unit 22 and an authentication information transmission control unit 24. The AP function unit 14 provides a function of causing the wireless communication device 10 to operate as an AP in wireless communication with a wireless client via the first wireless communication unit 22. When transmission of authentication information is requested by the wireless client, the authentication information transmission control unit 24 generates authentication information based on information stored in the authentication information storage unit 18, and causes the first wireless communication unit 22 to transmit the authentication information to the wireless client that has requested the authentication information.

The client function unit 16 includes a second wireless communication unit 26 and a detection unit 30. The client function unit 16 provides a function of causing the wireless communication device 10 to operate as a wireless client in wireless communication with other APs via the second wireless communication unit 26.

Specifically, based on a signal received by the second wireless communication unit 26, the detection unit 30 monitors the presence of another AP that transmits the same SSID as that of the wireless communication network including the first authorized AP 12. Further, when the detection unit 30 has detected another AP that transmits the same SSID, the detection unit 30 controls the second wireless communication unit 26 to perform wireless communication with the detected other AP by using a MAC address different from the MAC address of the wireless communication device 10. When the detection unit 30 has detected another AP that transmits the same SSID, and when the detection unit 30 has detected that the detected AP does not request a password or the authentication scheme corresponding to the detected AP is different from that of the first authorized AP 12, the detection unit 30 detects the AP as an unauthorized AP.

Figure 2:
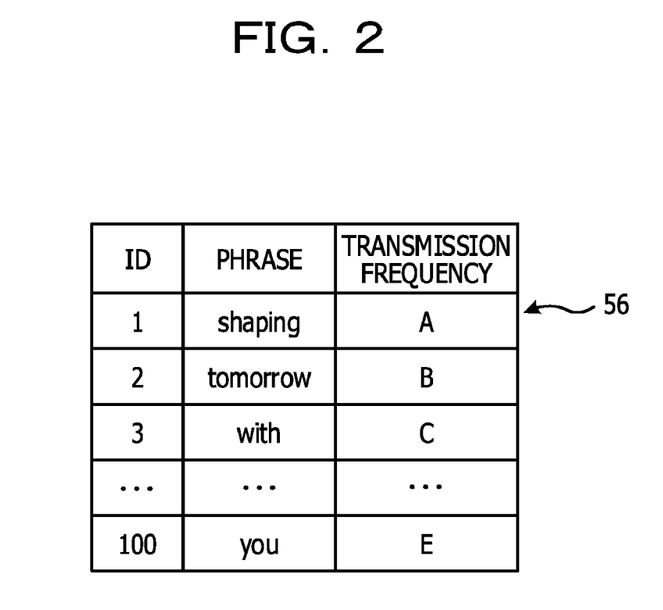
FIG. 2 is a diagram illustrating an example of an authentication information table.

The authentication information storage unit 18 stores in advance, as the authentication information, an authentication information table 56 illustrated in FIG. 2 in addition to the SSID and the password of the wireless communication network including the first authorized AP 12, the MAC address of the wireless communication device 10, and the information on the authentication scheme to be used for wireless communication. In the authentication information table 56, a plurality of phrases (examples of the authentication information) are registered in association with IDs for identifying the individual phrases and transmission frequency information indicating transmission frequencies. Note that the ID is an example of identification information according to this embodiment. The wireless communication devices that operate as authorized APs forming a single wireless communication network have the same information registered in the respective authentication information tables 56.

Note that the first wireless communication unit 22 and the second wireless communication unit 26 are examples of a wireless communication unit according to this embodiment, and the detection unit 30 is an example of a detection unit according to this embodiment. Further, the authentication information storage unit 18 is an example of an authentication information storage unit according to this embodiment, and the wired communication unit 20 is an example of a communication unit according to this embodiment.

Figure 3:
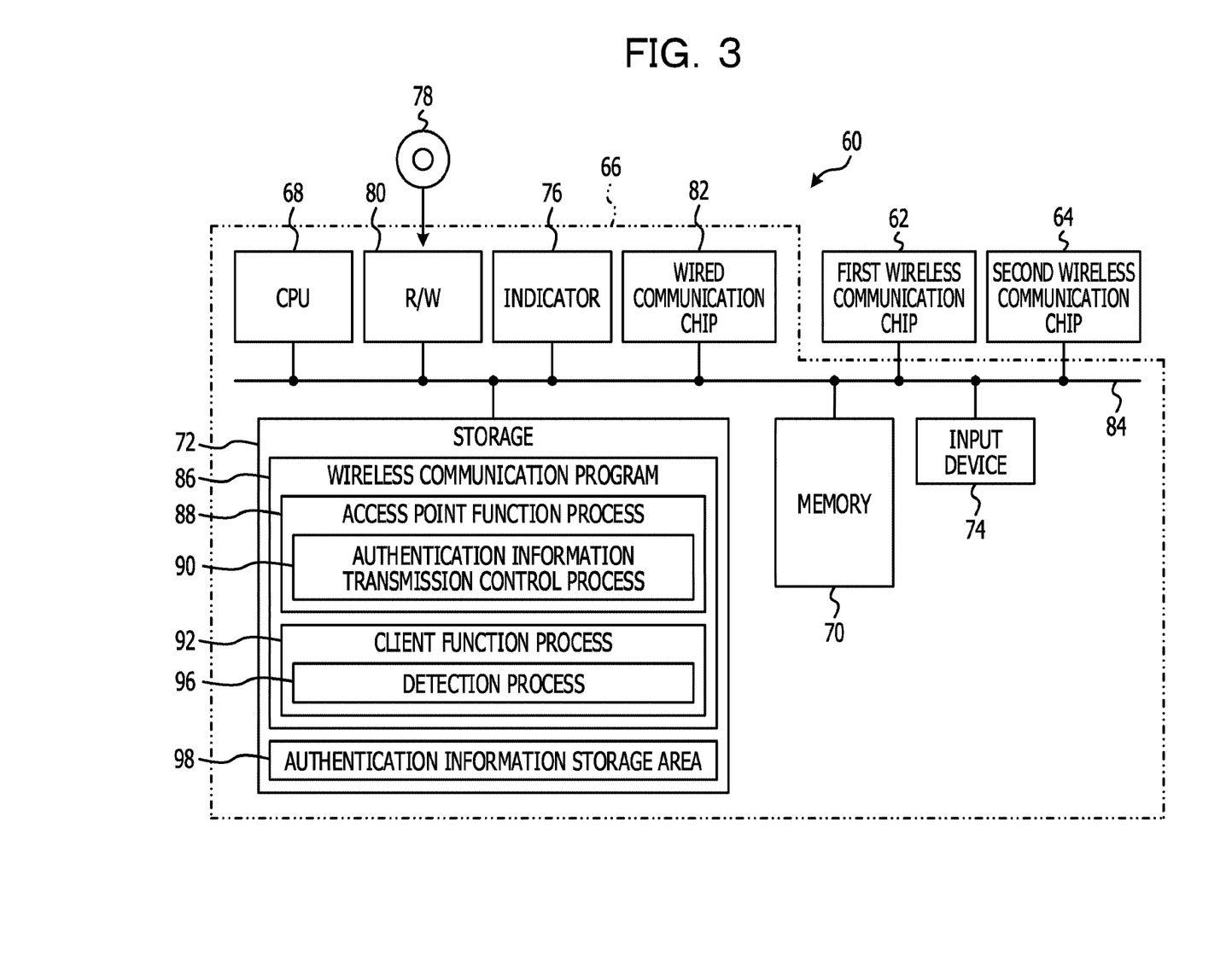
FIG. 3 is a schematic block diagram of hardware including a computer that functions as the wireless communication device.

As illustrated in FIG. 3, the wireless communication device 10 is implemented by hardware (H/W) 60 including a computer 66, a first wireless communication chip 62, and a second wireless communication chip 64. The first wireless communication chip 62 functions as the first wireless communication unit 22, and the second wireless communication chip 64 functions as the second wireless communication unit 26.

The computer 66 includes a CPU 68, a memory 70, a non-volatile storage 72, an input device 74 including one or more switches, and an indicator 76 including one or more lamps (for example, light emitting diodes (LEDs)). Further, the computer 66 includes a reading and writing device (R/W) 80 such as a USB interface configured to read and write data from and to a recording medium 78 (for example, a universal serial bus (USB) memory), and a wired communication chip 82 that functions as the wired communication unit 20. The CPU 68, the memory 70, the storage 72, the input device 74, the indicator 76, the R/W 80, the wired communication chip 82, the first wireless communication chip 62, and the second wireless communication chip 64 are connected to each other via a bus 84.

The storage 72 is implemented by a hard disk drive (HDD), a solid state drive (SSD), a flash memory, or the like. The storage 72 stores a wireless communication program 86 for causing the H/W 60 including the computer 66 to function as the wireless communication device 10. The CPU 68 reads the wireless communication program 86 from the storage 72 and loads the wireless communication program 86 on the memory 70 to sequentially execute processes included in the wireless communication program 86. The wireless communication program 86 includes an AP function process 88 and a client function process 92. The AP function process 88 includes an authentication information transmission control process 90. The client function process 92 includes a detection process 96.

The CPU 68 operates as the AP function unit 14 illustrated in FIG. 1 by executing the AP function process 88. More specifically, the CPU 68 operates as the authentication information transmission control unit 24 illustrated in FIG. 1 by executing the authentication information transmission control process 90. Further, the CPU 68 operates as the client function unit 16 illustrated in FIG. 1 by executing the client function process 92. More specifically, the CPU 68 operates as the detection unit 30 illustrated in FIG. 1 by executing the detection process 96. Thus, the H/W 60 including the computer 66 that has executed the wireless communication program 86 functions as the wireless communication device 10. The wireless communication program 86 is an example of a wireless communication program according to this embodiment.

Further, the storage 72 is provided with an authentication information storage area 98. The authentication information storage area 98 stores in advance the authentication information including the authentication information table 56. Thus, the storage 72 functions as the authentication information storage unit 18 illustrated in FIG. 1.

The computer 66 may be provided with a CPU that operates as the AP function unit 14, and a CPU that operates as the client function unit 16. Further, the wireless communication device 10 may be implemented by, for example, a semiconductor integrated circuit, more specifically, an application specific integrated circuit (ASIC).

Next, operations of this embodiment are described. The AP function unit 14 of the wireless communication device 10 controls the first wireless communication unit 22 to transmit a beacon signal at predetermined time intervals. The beacon signal includes information such as the SSID of the wireless communication network including the first authorized AP 12, the MAC address of the wireless communication device 10, the authentication scheme, and the transmission speed. When the user who is carrying the terminal device 34 has reached the wirelessly communicable range of the wireless communication device 10, the client function unit 38 detects that the wireless communication unit 36 has received the beacon signal, and the SSID and other information included in the beacon signal are displayed on a display of the terminal device 34.

Figure 6:
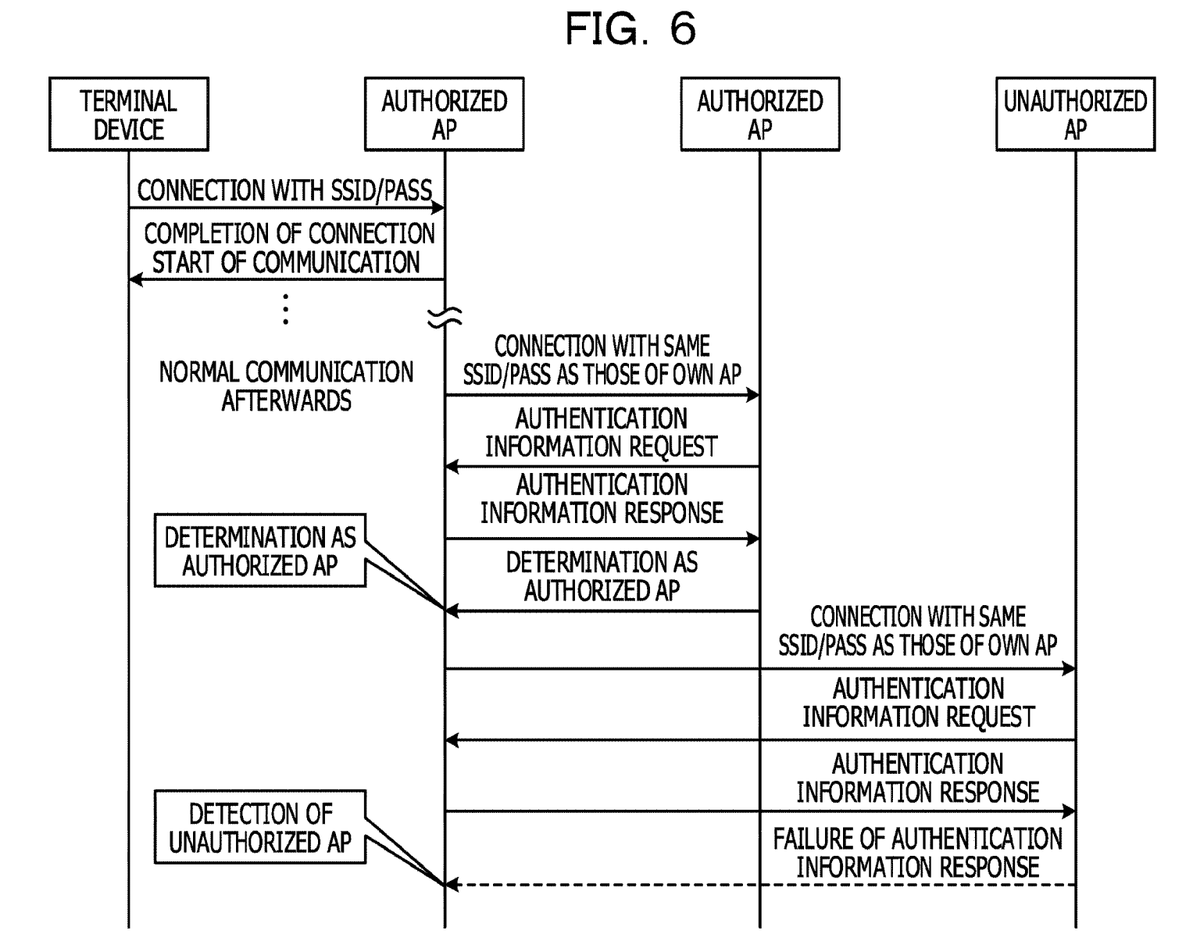
FIG. 6 is a time chart illustrating an example of a sequence of communications between authorized APs and other devices.

When the user instructs connection to the wireless communication network of the displayed SSID and inputs the password of the wireless communication network, the client function unit 38 causes the terminal device 34 to transmit a connection request to the wireless communication device 10 (first authorized AP 12). This connection request corresponds to a communication represented by "CONNECTION WITH SSID/PASS" in FIG. 6, and includes the SSID and the password of the wireless communication network that is a connection destination, and the MAC addresses of the wireless communication device 10 and the terminal device 34.

When the first wireless communication unit 22 has received the connection request from the terminal device 34, the AP function unit 14 determines whether the connection request is directed to the first authorized AP 12 based on the SSID and the MAC address included in the connection request. When the AP function unit 14 has determined that the received connection request is directed to the first authorized AP 12, the AP function unit 14 verifies the password included in the connection request against the password stored in the authentication information storage unit 18 to determine whether the connection request is valid.

When the AP function unit 14 has determined that the connection request is valid, the AP function unit 14 assigns an IP address to the terminal device 34 that has transmitted the connection request, and registers the assigned IP address and the MAC address of the terminal device 34 in an address resolution protocol (ARP) table. Then, the AP function unit 14 causes the first wireless communication unit 22 to transmit a connection permission to the terminal device 34 that has transmitted the connection request. This connection permission corresponds to a communication represented by "COMPLETION OF CONNECTION/START OF COMMUNICATION" in FIG. 6. After that, normal wireless communication is performed between the wireless communication device 10 (first authorized AP 12) and the terminal device 34.

Note that, in the sequence of wireless communications described above, the SSID of the wireless communication network including the first authorized AP 12 is an example of specific identification information, and the MAC address of the wireless communication device 10 is an example of a first address.

Figure 4:
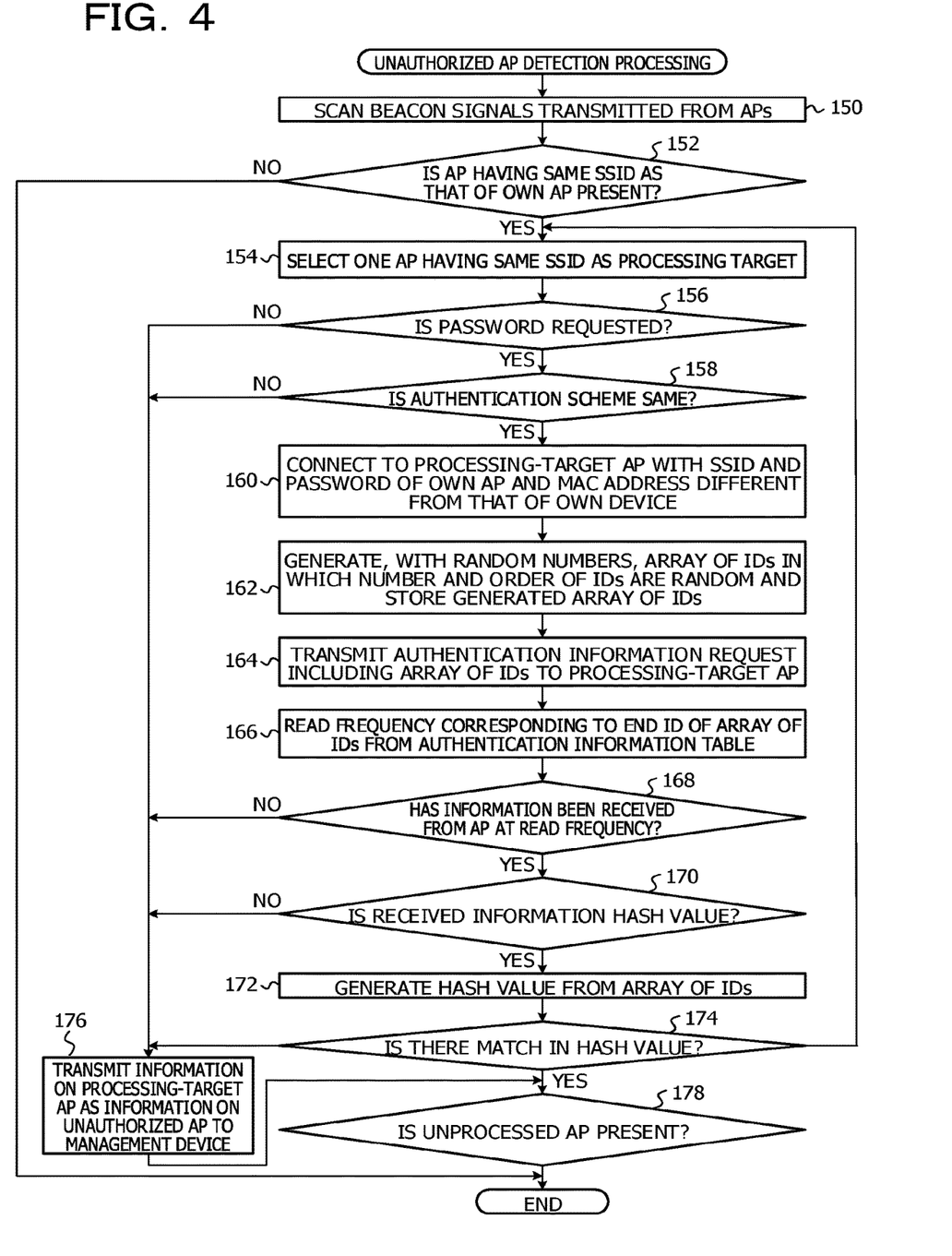
FIG. 4 is a flowchart illustrating an example of unauthorized AP detection processing.

Next, unauthorized AP detection processing to be periodically executed by the client function unit 16 of the wireless communication device 10 is described with reference to FIG. 4. In step 150, the detection unit 30 of the client function unit 16 causes the second wireless communication unit 26 to scan beacon signals transmitted from APs. Then, the detection unit 30 causes the memory or the like to store information on all the APs detected by the scanning and present around the wireless communication device 10 (in a range in which wireless communication with the wireless communication device 10 may be performed). The information on the individual APs to be stored in the memory or the like includes information such as the SSID, the MAC address, and the authentication scheme extracted from the beacon signal, the signal strength of the beacon signal, and the incoming direction of the beacon signal.

In step 152, the detection unit 30 compares the SSIDs included in the information on all the APs present around the wireless communication device 10, which are stored in the memory or the like through the scanning in step 150, with the SSID of the first authorized AP 12, which is stored in the authentication information storage unit 18. Then, the detection unit 30 determines whether an AP having the same SSID as that of the first authorized AP 12 is present around the wireless communication device 10 (first authorized AP 12). When the result of the determination in step 152 is "No", the unauthorized AP detection processing is terminated.

When an AP having the same SSID as that of the first authorized AP 12 is present around the wireless communication device 10 (first authorized AP 12), on the other hand, this AP is any one of the authorized AP (for example, the second authorized AP 42) and the unauthorized AP 46. Therefore, when the result of the determination in step 152 is "Yes", the processing proceeds to step 154. In step 154, the detection unit 30 selects, as a processing target, any one of the APs that are present around the wireless communication device 10 (first authorized AP 12) and have the same SSID as that of the first authorized AP 12.

In subsequent step 156, the detection unit 30 references the information on the processing-target AP, which is stored in the memory or the like, to determine whether the processing-target AP requests a password for authentication. The result of the determination in step 156 is "No" when the authentication scheme of the processing-target AP, which is stored in the memory or the like, is open authentication, and is "Yes" when the authentication scheme is authentication other than open authentication. When the processing-target AP does not request a password for authentication, the security policy of the processing-target AP is different from that of the first authorized AP 12, and hence the detection unit 30 detects the processing-target AP as the unauthorized AP 46.

Therefore, when the result of the determination in step 156 is "No", the processing proceeds to step 176. In step 176, the detection unit 30 causes the wired communication unit 20 to transmit the information on the processing-target AP, which is stored in the memory or the like, as information on the unauthorized AP 46 to the management device 52. The information on the unauthorized AP 46 to be transmitted to the management device 52 includes information such as the MAC address of the unauthorized AP 46, the authentication scheme, the signal strength of the beacon signal, and the incoming direction of the beacon signal. After the processing in step 176 is performed, the processing proceeds to step 178.

When the result of the determination in step 156 is "Yes", the processing proceeds to step 158. In step 158, the detection unit 30 verifies the authentication scheme included in the information on the processing-target AP, which is stored in the memory or the like, against the information on the authentication scheme, which is stored in the authentication information storage unit 18, to determine whether the authentication scheme of the processing-target AP is the same as that of the first authorized AP 12. Also when the authentication scheme of the processing-target AP is not the same as that of the first authorized AP 12, the security policy of the processing-target AP is different from that of the first authorized AP 12, and hence the detection unit 30 detects the processing-target AP as the unauthorized AP 46. Therefore, also when the result of the determination in step 158 is "No", the processing proceeds to step 176. In step 176, the detection unit 30 causes the wired communication unit 20 to transmit the information on the processing-target AP as the information on the unauthorized AP 46 to the management device 52.

When the result of the determination in step 158 is "Yes", the processing proceeds to step 160. In step 160, the detection unit 30 acquires the SSID of the first authorized AP 12, the password of the first authorized AP 12, and the MAC address of the wireless communication device 10 from the authentication information storage unit 18, and generates another MAC address different from the MAC address of the wireless communication device 10. Another MAC address may be generated by, for example, generating a MAC address with a random number and checking that the generated MAC address does not match the MAC address of the wireless communication device 10. Further, a plurality of MAC addresses different from the MAC address of the wireless communication device 10 may be stored in advance and a MAC address to be used may be selected from the plurality of MAC addresses randomly or cyclically.

Then, the detection unit 30 causes the second wireless communication unit 26 to transmit a connection request including the SSID of the first authorized AP 12, the password of the first authorized AP 12, and the generated other MAC address to the processing-target AP. This connection request corresponds to a communication represented by "CONNECTION WITH SAME SSID/PASS AS THOSE OF OWN AP" in FIG. 6. The MAC address used in this connection request is an example of a second address according to this embodiment.

Another MAC address different from the MAC address of the wireless communication device 10 is generated and used for the following reason. That is, notification of the MAC address of the wireless communication device 10 is provided to the surroundings with beacon signals from the first authorized AP 12, and hence, when the unauthorized AP 46 is present in the surroundings, the unauthorized AP 46 may recognize the MAC address of the wireless communication device 10 (authorized AP). Therefore, when the connection request is transmitted to the unauthorized AP 46 by using the MAC address of the wireless communication device 10, the unauthorized AP 46 may detect that the connection request is transmitted from the authorized AP based on the MAC address, and may perform special processing for avoiding detection of the unauthorized AP 46.

When the connection to the processing-target AP is made successfully, a connection permission is transmitted from the processing-target AP to the wireless communication device 10 (first authorized AP 12 that functions as a wireless client). This connection permission corresponds to a communication represented by "COMPLETION OF CONNECTION/START OF COMMUNICATION" in FIG. 6. When the connection permission from the processing-target AP is received by the second wireless communication unit 26, the processing proceeds to step 162. In step 162 and other subsequent steps, further processing is performed so as to check whether the processing-target AP is the unauthorized AP 46.

Specifically, in step 162, the detection unit 30 generates, by using random numbers, an array of IDs indicating the phrases registered in the authentication information table 56. In this array of IDs, the number of IDs to be included in the array and the order of IDs to be included in the array are set randomly. Then, the detection unit 30 causes the memory or the like to store the generated array of IDs. In subsequent step 164, the detection unit 30 causes the second wireless communication unit 26 to transmit an authentication information request including the array of IDs generated by the detection unit 30 in step 162 to the processing-target AP. This authentication information request corresponds to a communication represented by "AUTHENTICATION INFORMATION REQUEST" in FIG. 6. Further, FIGS. 7 and 8 each illustrate "1, 2, 3, 100" as an example of the array of IDs to be included in the authentication information request.

In subsequent step 166, the detection unit 30 reads transmission frequency information corresponding to an end ID of the array of IDs stored in the memory or the like from the authentication information table 56 stored in the authentication information storage unit 18. Then, in step 168, the detection unit 30 determines whether the second wireless communication unit 26 has received some information from the processing-target AP at a frequency indicated by the transmission frequency information read in step 166.

Figure 5:
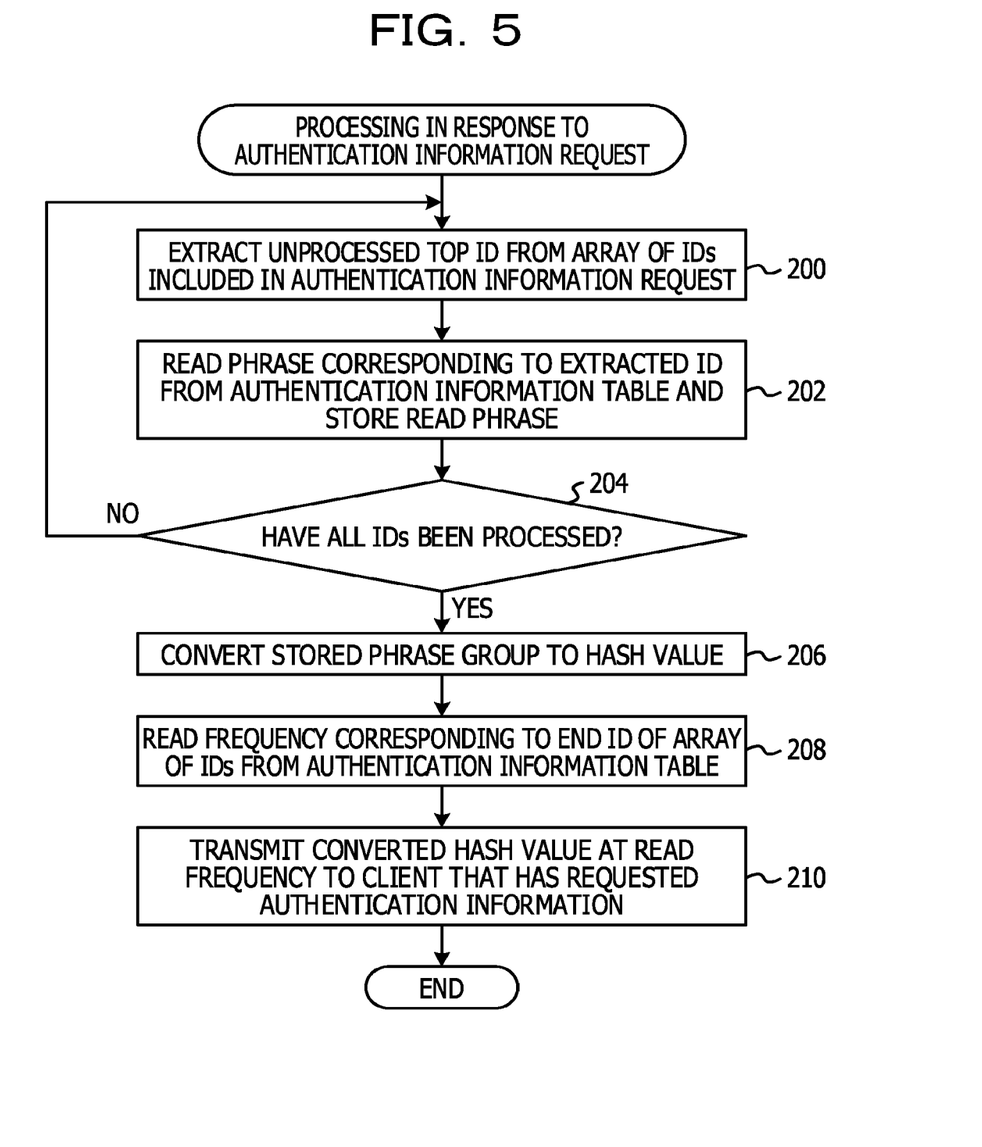
FIG. 5 is a flowchart illustrating an example of processing in response to an authentication information request.

Processing in response to the authentication information request, which is executed when the authorized AP has received the above-mentioned authentication information request from the wireless client, is described with reference to FIG. 5. Note that the terminal device 34 does not transmit any authentication information request, and hence the wireless client that has requested authentication information is an AP that operates as the wireless client.

In step 200, the authentication information transmission control unit 24 of the AP function unit 14 extracts an unprocessed top ID from the array of IDs included in the authentication information request received from the wireless client. In step 202, the authentication information transmission control unit 24 reads a phrase corresponding to the ID extracted in step 200 from the authentication information table 56 stored in the authentication information storage unit 18, and causes the memory or the like to store the read phrase.

Figure 7:
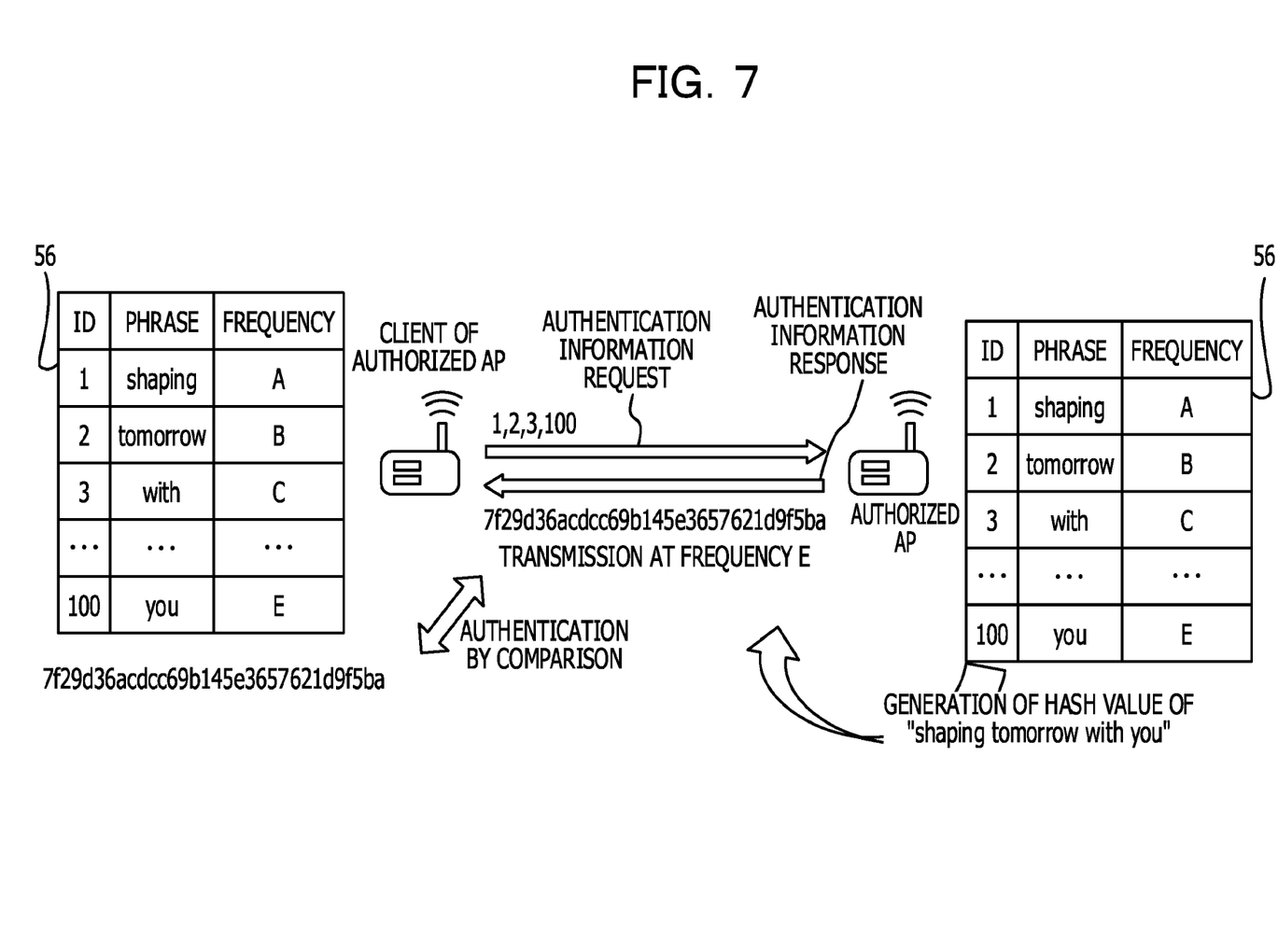
FIG. 7 is a schematic diagram for describing transmission and reception of authentication information between the authorized APs.

In subsequent step 204, the authentication information transmission control unit 24 determines whether phrases are read for all the IDs included in the array of IDs. When the result of the determination in step 204 is "No", the processing returns to step 200, and step 200 to step 204 are repeated until the result of the determination in step 204 becomes "Yes". When the result of the determination in step 204 is "Yes", the processing proceeds to step 206. FIG. 7 illustrates an example in which, based on the array of IDs "1, 2, 3, 100" included in the authentication information request, a corresponding phrase group "shaping tomorrow with you" is stored in the memory or the like.

In step 206, the authentication information transmission control unit 24 converts the phrase group stored in the memory or the like to a hash value. FIG. 7 illustrates an example in which the phrase group "shaping tomorrow with you" is converted to a hash value "7f29d36acdcc69b145e3657621d9f5ba". In subsequent step 208, the authentication information transmission control unit 24 reads transmission frequency information corresponding to an end ID of the array of IDs included in the authentication information request from the authentication information table 56 stored in the authentication information storage unit 18. In the example illustrated in FIG. 7, a frequency "E" corresponding to an ID "100" at the end of the array of IDs "1, 2, 3, 100" is read from the authentication information table 56.

In step 210, the authentication information transmission control unit 24 causes the first wireless communication unit 22 to transmit, to the wireless client that has requested authentication information, authentication information including the hash value obtained by the conversion in step 206 at the frequency indicated by the transmission frequency information read in step 208. This transmission of authentication information corresponds to a communication represented by "AUTHENTICATION INFORMATION RESPONSE" in FIGS. 6 and 7. When the processing in step 210 is completed, the processing in response to the authentication information request is terminated.

The unauthorized AP detection processing illustrated in FIG. 4 is described again. When the second wireless communication unit 26 has received some information from the processing-target AP at the frequency corresponding to the end ID of the array of IDs included in the previously-transmitted authentication information request, the result of the determination in step 168 is "Yes", and the processing proceeds to step 170.

In step 170, the detection unit 30 determines whether the information received from the processing-target AP is authentication information including a hash value. When the result of the determination in step 170 is "Yes", the processing proceeds to step 172. In step 172, the detection unit 30 performs the same processing as in steps 200 to 206 of the above-mentioned processing in response to the authentication information request (FIG. 5) based on the array of IDs stored in the memory or the like, thereby generating a hash value corresponding to the array of IDs.

In step 174, the detection unit 30 determines whether the hash value included in the authentication information received from the processing-target AP matches the hash value generated in step 172. When the result of the determination in step 174 is "Yes", the detection unit 30 determines that the processing-target AP is an authorized AP (for example, the second authorized AP 42), and the processing proceeds to step 178.

In the unauthorized AP 46, the authentication information table 56 is not stored. Therefore, the unauthorized AP 46 is unable to recognize the phrase group corresponding to the array of IDs even when the unauthorized AP 46 has received the authentication information request including the array of IDs. Further, the unauthorized AP 46 is unable to recognize the frequency corresponding to the end ID of the array of IDs included in the received authentication information request. Thus, the unauthorized AP 46 is unable to transmit the requested authentication information at the requested frequency as indicated by the broken line represented by "FAILURE OF AUTHENTICATION INFORMATION RESPONSE" in FIG. 6.

Figure 8:
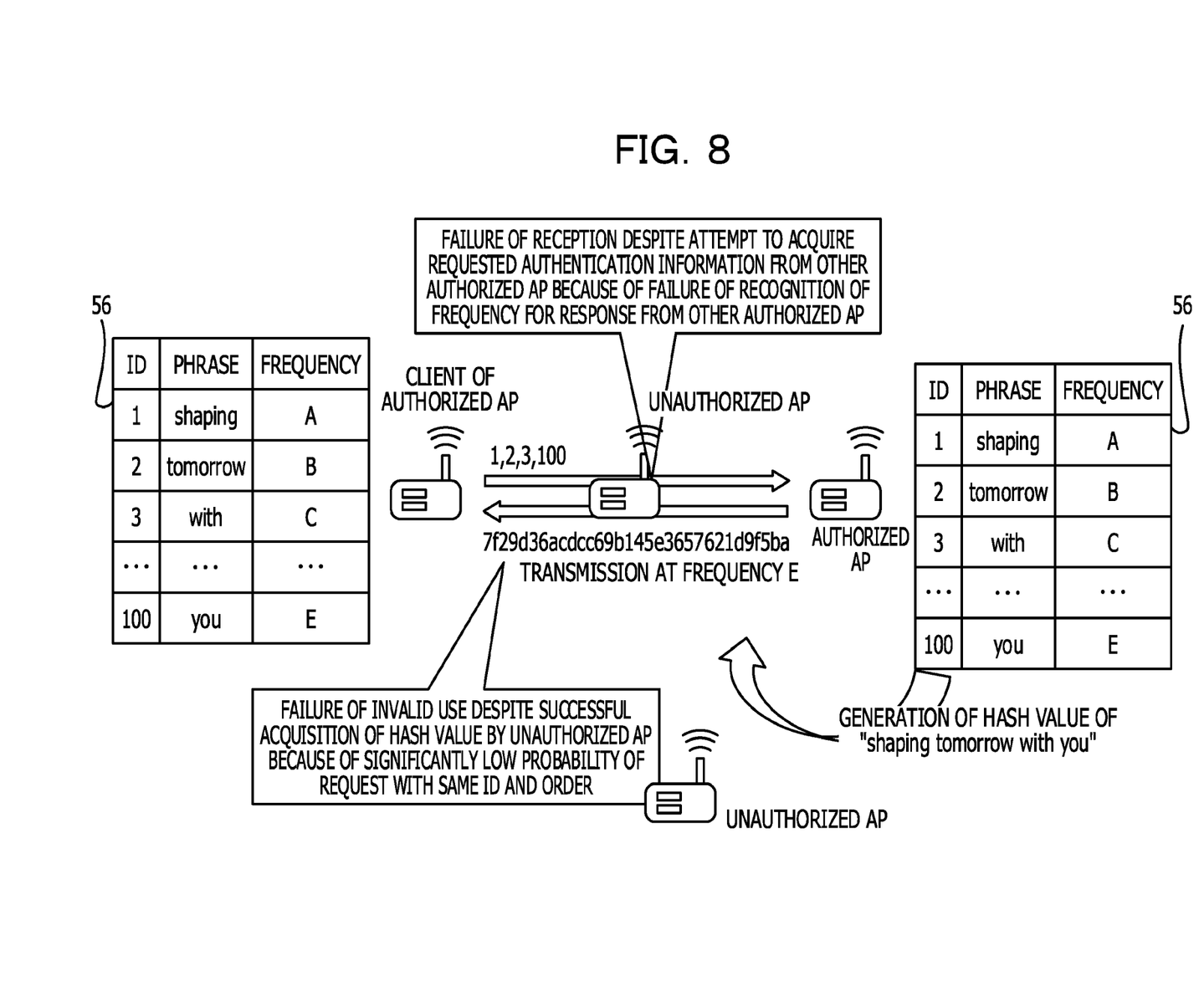
FIG. 8 is a schematic diagram for describing that an unauthorized AP is unable to transmit the authentication information.

Moreover, since the unauthorized AP 46 is unable to recognize the frequency corresponding to the end ID of the array of IDs, even when the unauthorized AP 46 has inquired correct information by transferring the received authentication information request to another authorized AP as illustrated in FIG. 8, for example, the unauthorized AP 46 is unable to receive correct information from the other authorized AP. Further, even when the unauthorized AP 46 has successfully acquired the hash value transmitted and received between the authorized APs, the unauthorized AP 46 is unable to use the acquired hash value in an invalid way because the number and the order of IDs in the array of IDs are random and therefore the probability of matching of the array of IDs is significantly low.

As an example, when the number of phrases registered in the authentication information table 56 is 100, the number of possible outcomes for the array of IDs in which the number and the order of IDs are random is represented by the following expression (1):

$$100P1 + 100P2 + \ldots + 100P100 \approx 6 \times 10^{158} \tag{1},$$

where nPr denotes total number of permutations for choosing r objects from n distinct objects. As is apparent from expression (1), there is a significantly low probability that the unauthorized AP 46 will receive an authentication information request including the same array of IDs from the authorized AP.

Based on the above, the unauthorized AP detection processing proceeds to step 176 when the result of the determination in any one of steps 168, 170, and 174 is "No". Then, in step 176, the detection unit 30 causes the wired communication unit 20 to transmit the information on the processing-target AP, which is stored in the memory or the like, as information on the unauthorized AP 46 to the management device 52.

In step 178, the detection unit 30 determines whether an AP which has not been subjected to the above-mentioned processing is present among the APs detected in previous step 152, which are present around the first authorized AP 12 and have the same SSID as that of the first authorized AP 12. When the result of the determination in step 178 is "Yes", the processing returns to step 154, and the detection unit 30 selects the above-mentioned unprocessed AP as a processing target, and performs the processing in subsequent step 156 and other steps.

Thus, step 154 to step 178 are repeated until the result of the determination in step 178 becomes "No", and determination as to whether the AP is the unauthorized AP 46 is made for all the APs that are present around the first authorized AP 12 and have the same SSID as that of the first authorized AP 12. When the result of the determination in step 178 is "No", the unauthorized AP detection processing is terminated.

The management device 52 that has received the information on the unauthorized AP 46 from the authorized AP notifies an administrator of the detection of the unauthorized AP 46, and also notifies the administrator of an estimated location of the unauthorized AP 46, which is computed based on the received information on the unauthorized AP 46. In this case, it is preferred that the unauthorized AP 46 be detected by each of the authorized APs because the computation accuracy of the location of the unauthorized AP 46 is improved. Further, an authorized AP which has not detected the unauthorized AP 46 may be instructed to execute the unauthorized AP detection processing.

As a first measure conceivable for the case in which the unauthorized AP 46 is detected, the administrator may visit the place that the administrator is notified of so as to remove the unauthorized AP 46. In addition, the authorized AP may perform processing for disabling the unauthorized AP 46 so as to reduce damage that may be caused by the unauthorized AP 46 until the unauthorized AP 46 is removed.

As the processing for disabling the unauthorized AP 46, for example, it is conceivable that the authorized AP performs processing for repeatedly transmitting connection requests to the unauthorized AP 46 with different MAC addresses each time. The number of IP addresses assignable by an AP to a wireless client is finite, and hence the above-mentioned processing may deplete the IP addresses assignable by the unauthorized AP 46 to the wireless client. This processing may reduce damage that may be caused by the unauthorized AP 46 as a result of newly connecting to the unauthorized AP 46 from the terminal devices 34 of general users.

As another example of the processing for disabling the unauthorized AP 46, it is conceivable that an ARP command is transmitted to the unauthorized AP 46 so as to rewrite the MAC address registered in the ARP table held by the unauthorized AP 46. This processing may interrupt wireless communication between the unauthorized AP 46 and the wireless client.

As described above, in this embodiment, the computer 66 of the wireless communication device 10 including the second wireless communication unit 26 and the computer 66, and configured to operate as the first authorized AP 12 that transmits the SSID of the first authorized AP 12 and performs wireless communication with wireless clients by using the MAC address of the wireless communication device 10 is caused to perform the following processing. That is, when a processing-target AP that transmits the SSID of the first authorized AP 12 is detected based on a signal received by the second wireless communication unit 26, the second wireless communication unit 26 is controlled to perform wireless communication with the detected processing-target AP by using a MAC address different from the MAC address of the wireless communication device 10. When it is detected that the processing-target AP does not request a password or the authentication scheme of the processing-target AP is different from the authentication scheme of the first authorized AP 12, the processing-target AP is detected as the unauthorized AP 46. Thus, the unauthorized AP 46 may be detected by using the authorized AP without assuming the presence of the management device, and hence the provider of the wireless communication environment may easily detect the presence of the unauthorized AP 46. Along with this advantage, another advantage is attained in that the emergence of the unauthorized AP 46 is suppressed in advance.

Further, in this embodiment, the second wireless communication unit 26 is controlled to perform wireless communication with the processing-target AP by using a password to be requested from the slave wireless clients, and hence the unauthorized AP impersonating the authorized AP may be detected more accurately.

Further, in this embodiment, authentication information is stored in advance in the authentication information storage unit 18, and when the authentication scheme of the processing-target AP matches the authentication scheme of the first authorized AP 12, the second wireless communication unit 26 is controlled to request transmission of the authentication information from the processing-target AP. When no information is received from the processing-target AP, and when information received from the processing-target AP does not match the authentication information stored in the authentication information storage unit 18, the processing-target AP is detected as the unauthorized AP 46. Thus, the unauthorized AP 46 may be detected also when the unauthorized AP 46 requests the same password as that of the authorized AP and matches the authentication scheme with that of the authorized AP.

Moreover, in this embodiment, when the information received from the processing-target AP does not match a hash value of the authentication information stored in the authentication information storage unit 18, the processing-target AP is detected as the unauthorized AP 46. Thus, even when the processing-target AP is an authorized AP and the hash value transmitted from the AP is leaked to the unauthorized AP 46, the unauthorized AP 46 is unable to know the original authentication information. Accordingly, the leakage of the authentication information to the unauthorized AP 46 may be suppressed.

Further, in this embodiment, the authentication information storage unit 18 stores a plurality of phrases as the authentication information in association with respective IDs. Further, authentication information to be transmitted is randomly specified by using a corresponding ID, and the second wireless communication unit 26 is controlled to request transmission of the authentication information from the processing-target AP. When the information received from the processing-target AP does not match the authentication information to be transmitted, which is specified by using the corresponding ID, out of the plurality of pieces of the authentication information stored in the authentication information storage unit 18, the processing-target AP is detected as the unauthorized AP 46. Thus, the AP that does not hold the authentication information may be detected as the unauthorized AP 46 reliably.

Further, in this embodiment, the authentication information storage unit 18 stores the plurality of phrases as the authentication information in association with the respective IDs and respective pieces of transmission frequency information. Further, the authentication information to be transmitted is specified by using the corresponding ID, and the second wireless communication unit 26 is controlled to request the transmission of the authentication information from the processing-target AP. When no information is received from the processing-target AP at a frequency indicated by transmission frequency information corresponding to the authentication information to be transmitted, which is specified by using the corresponding ID, the processing-target AP is detected as the unauthorized AP 46. Thus, the AP that does not hold the authentication information may be detected as the unauthorized AP 46 reliably.

Moreover, in this embodiment, when any one of the slave wireless clients specifies the authentication information to be transmitted by using the corresponding ID and requests the transmission of authentication information, the authentication information to be transmitted, which is specified by using the corresponding ID, and the corresponding transmission frequency information are read from the authentication information storage unit 18. Then, the second wireless communication unit 26 is controlled to transmit, by wireless communication at the frequency indicated by the read transmission frequency information, the read authentication information to be transmitted or a hash value of the read authentication information to the wireless communication terminal that has requested the transmission of the authentication information. Thus, it is possible to reduce the occurrence of a case in which another authorized AP detects the wireless communication device 10 as an unauthorized AP.

Further, in this embodiment, when the processing-target AP is detected as the unauthorized AP 46, the wired communication unit 20 is caused to transmit information on the unauthorized AP 46 to the management device 52. Thus, the administrator is allowed to promptly recognize the emergence of the unauthorized AP 46 and take a measure against the emergence, thereby being capable of reducing damage that may be caused by the unauthorized AP 46.

The wireless communication device 10 may execute the unauthorized AP detection processing, for example, at predetermined time intervals. However, the timing is not limited thereto, and the scanning in step 150 and the determination in step 152 as to whether an AP having the same SSID is present may be executed, for example, at predetermined time intervals, whereas the processing in step 154 and other subsequent steps may be executed, for example, when the number of APs having the same SSID has changed.

Further, the above description is directed to an embodiment in which authentication information including a hash value is transmitted at a frequency corresponding to an end ID of the array of IDs, but the embodiment is not limited thereto. For example, frequencies corresponding to other IDs such as a top or middle ID may be used instead of the end ID.

Further, the above description is directed to an embodiment in which the wireless communication program 86 is stored (installed) in advance in the storage 72. Alternatively, the wireless communication program according to this embodiment may be provided in the form of being recorded in recording media such as a CD-ROM, a DVD-ROM, or a memory card.

All documents, patent applications, and technical standards recited herein are incorporated herein by reference to the same extent as if each individual document, patent application, or technical standard was specifically and individually indicated to be incorporated by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication device, comprising:
    a memory; and
    processor circuitry coupled to the memory, the processor circuitry being configured to:
    broadcast first wireless signals including a first identifier that identifies a wireless network, the first wireless signals further including an authentication scheme information, the authentication scheme information indicating an authentication scheme to be used when the wireless communication device establishes a connection with a wireless terminal;
    execute a first processing when the wireless communication device receives a first request from a first wireless terminal, the first request being a request for coupling to the wireless network, the first processing including establishing a connection with the first wireless terminal by using the authentication scheme indicated in the authentication scheme information; and
    execute a second processing when the wireless communication device detects a second wireless signal broadcasted from another wireless communication device, the second wireless signal including a second identifier same as the first identifier of the first wireless signal broadcasted by the wireless communication device, the second processing including
        determining that the another wireless communication device is an unauthorized access point when the second wireless signal does not include the authentication scheme information,
        determining that the another wireless communication device is the unauthorized access point when, although the second wireless signal includes the authentication scheme information, the authentication scheme information in the second wireless signal has a content different from the authentication scheme information in the first wireless signal,
        transmitting a second request to the another wireless communication device when the authentication scheme information in the second wireless signal has a content same as the authentication scheme information in the first wireless signal, the second request including a first address information that indicates a first media access control (MAC) address different from a second MAC address assigned to the wireless communication device, and
        determining, based on a response from the another wireless communication device with respect to the second request, whether the another wireless communication device is the unauthorized access point.

2. The wireless communication device according to claim 1, wherein the determination is performed based on whether the response transmitted from the another wireless communication device includes a request for a password.

3. The wireless communication device according to claim 1, wherein the determination is performed based on a detected authentication scheme performed by the another wireless communication device.

4. The wireless communication device according to claim 1, wherein
the response includes a hash value, and
the determination is performed based on whether the hash value included in the response matches another hash value stored in the memory.

5. The wireless communication device according to claim 4, wherein the hash value is generated by converting a phrase stored in the memory.

6. The wireless communication device according to claim 1, wherein the processor is configured to transmit information to a management device when the determination indicates that the another wireless communication device is unauthorized, the information indicating that the another wireless communication device is unauthorized.

7. The wireless communication device according to claim 1, wherein the processor is configured to operate as a wireless access point serving the wireless network.

8. The wireless communication device according to claim 1, wherein the specific identifier is a service set identifier (SSID).

9. The wireless communication device according to claim 1, wherein the processor is configured to communicate with the wireless terminal according to a first address, and to communicate with the another wireless communication device according to a second address.

10. The wireless communication device according to claim 9, wherein
the first address is a first MAC address of the wireless communication device, and
the second address is a second MAC address of the wireless communication device that is different than the first MAC address.

11. The wireless communication device according to claim 10, wherein the memory is configured to store the first MAC address and the second MAC address.

12. The wireless communication device according to claim 1, wherein
the wireless communication device serves the wireless network with one or more wireless communication devices configured to broadcast wireless signals including the specific identifier that identifies the wireless network,
the one or more wireless communication devices being authorized, and
each of the one or more wireless communication devices wirelessly communicating with the wireless terminal when receiving a third request based on the specific identifier, the third request being transmitted, for coupling to the wireless network, from the wireless terminal.

13. The wireless communication device according to claim 1, wherein the determination is performed by
determining, based on the response, whether a first security policy of the another wireless communication device is identical to a second security policy of the wireless communication device, and
determining whether the another wireless communication device is unauthorized when the first security policy is not identical to the second security policy.

14. A wireless communication method, comprising:
broadcasting, by a wireless communication device, first wireless signals including a first identifier that identifies a wireless network, the first wireless signals further including an authentication scheme information, the authentication scheme information indicating an authentication scheme to be used when the wireless communication device establishes a connection with a wireless terminal;
execute a first processing when the wireless communication device receives a first request from a first wireless terminal, the first request being a request for coupling to the wireless network, the first processing including establishing a connection with the first wireless terminal by using the authentication scheme indicated in the authentication scheme information; and
execute a second processing when the wireless communication device detects a second wireless signal broadcasted from another wireless communication device the second wireless signal including a second identifier same as the first identifier of the first wireless signal broadcasted by the wireless communication device, the second processing including
determining that the another wireless communication device is an unauthorized access point when the second wireless signal does not include the authentication scheme information,
determining that the another wireless communication device is the unauthorized access point when, although the second wireless signal includes the authentication scheme information, the authentication scheme information in the second wireless signal has a content different from the authentication scheme information in the first wireless signal,
transmitting a second request to the another wireless communication device when the authentication scheme information in the second wireless signal has a content same as the authentication scheme information in the first wireless signal, the second request including a first address information that indicates a first media access control (MAC) address different from a second MAC address assigned to the wireless communication device, and
determining, based on a response from the another wireless communication device with respect to the second request, whether the another wireless communication device is the unauthorized access point.

15. A non-transitory computer readable storage medium that stores a program which, when executed by a wireless communication device, causes the wireless communication device to execute a process comprising:
broadcasting first wireless signals including a first identifier that identifies a wireless network, the first wireless signals further including an authentication scheme information, the authentication scheme information indicating an authentication scheme to be used when the wireless communication device establishes a connection with a wireless terminal;
execute a first processing when the wireless communication device receives a first request from a first wireless terminal, the first request being a request for coupling to the wireless network, the first processing including establishing a connection with the first wireless terminal by using the authentication scheme indicated in the authentication scheme information; and execute a second processing when the wireless communication device detects a second wireless signal broadcasted from another wireless communication device, the second wireless signal including a second identifier same as the first identifier of the first wireless signal broadcasted by the wireless communication device, the second processing including determining that the another wireless communication device is an unauthorized access point when the second wireless signal does not include the authentication scheme information, determining that the another wireless communication device is the unauthorized access point when, although the second wireless signal includes the authentication scheme information, the authentication scheme information in the second wireless signal has a content different from the authentication scheme information in the first wireless signal, transmitting a second request to the another wireless communication device when the authentication scheme information in the second wireless signal has a content same as the authentication scheme information in the first wireless signal, the second request including a first address information that indicates a first media access control (MAC) address different from a second MAC address assigned to the wireless communication device, and determining, based on a response from the another wireless communication device with respect to the second request, whether the another wireless communication device is the unauthorized access point.

* * * * *